US009569872B2

(12) United States Patent
Huang et al.

(10) Patent No.: US 9,569,872 B2
(45) Date of Patent: Feb. 14, 2017

(54) METHOD AND APPARATUS FOR RASTERIZATION

(75) Inventors: Genglin Huang, Beijing (CN); Hao Lin, Beijing (CN); Yu Tang, Beijing (CN)

(73) Assignees: Peking University Founder Group Co., Ltd., Beijing (CN); Beijing Founder Electronics Co., Ltd., Beijing (CN)

(*) Notice: Subject to any disclaimer, the term of this patent is extended or adjusted under 35 U.S.C. 154(b) by 865 days.

(21) Appl. No.: 13/879,610

(22) PCT Filed: Oct. 14, 2011

(86) PCT No.: PCT/CN2011/080804
§ 371 (c)(1),
(2), (4) Date: Jul. 19, 2013

(87) PCT Pub. No.: WO2012/048661
PCT Pub. Date: Apr. 19, 2012

(65) Prior Publication Data
US 2013/0293566 A1 Nov. 7, 2013

(30) Foreign Application Priority Data
Oct. 14, 2010 (CN) .......................... 2010 1 0512135

(51) Int. Cl.
*G06T 11/40* (2006.01)
*G06T 11/00* (2006.01)
*H04N 1/60* (2006.01)

(52) U.S. Cl.
CPC .............. *G06T 11/40* (2013.01); *G06T 11/001* (2013.01); *H04N 1/60* (2013.01)

(58) Field of Classification Search
None
See application file for complete search history.

(56) References Cited

U.S. PATENT DOCUMENTS 6,313,840 B1 * 11/2001 Bilodeau ................ G06T 15/04
345/423
2002/0180747 A1 12/2002 Lavelle et al.
(Continued)

FOREIGN PATENT DOCUMENTS

CN 1333519 A 1/2002
CN 1790378 A 6/2006
(Continued)

OTHER PUBLICATIONS

International Search Report mailed Jan. 19, 2012, issued from the ISA of the State Intellectual Property Office P.R. China in International Application No. PCT/CN2011/080804 (5 pages).

*Primary Examiner* — Aaron M Richer
(74) *Attorney, Agent, or Firm* — Finnegan, Henderson, Farabow, Garrett & Dunner, LLP

(57) ABSTRACT

The application provides a method for rasterization. According to the method, a primitive may be divided, at a position where a color abruptly changes in the primitive, into a plurality of sub-primitives with continuously and gradually changing colors. Each of the sub-primitives is then rasterized. The present application further provides an apparatus for rasterizing an image. The apparatus may comprise a dividing module configured to divide a primitive at a position where a color abruptly changes into a plurality of sub-primitives with continuously gradually changing colors. Furthermore, the apparatus may comprise a rasterizing module configure to rasterize each of the sub-primitives. The application may improve the speed of the rasterization and the quality of the processed image.

7 Claims, 5 Drawing Sheets

(56) References Cited

U.S. PATENT DOCUMENTS

| | | | |
|---|---|---|---|
| 2003/0132945 A1 | 7/2003 | Satoh et al. | |
| 2004/0012797 A1* | 1/2004 | Letellier | ............... G06K 15/02 358/1.9 |
| 2007/0140571 A1 | 6/2007 | Fan et al. | |

FOREIGN PATENT DOCUMENTS

| | | |
|---|---|---|
| CN | 101118480 A | 2/2008 |
| CN | 101140505 A | 3/2008 |
| JP | 2008-148165 | 6/2008 |
| WO | WO 2005-114572 A2 | 12/2005 |

\* cited by examiner

METHOD AND APPARATUS FOR RASTERIZATION

This application is a national phase application of International Application No. PCT/CN2011/080804, filed Oct. 14, 2011, designating the United States of America, which claims priority to, and benefit of Chinese Patent Application No. 201010512135.8, filed Oct. 14, 2010, the entirety of both of which are hereby incorporated by reference.

TECHNICAL FIELD

The present application relates to graphic image processing, in particular, to a method and an apparatus for rasterizing graphic images.

BACKGROUND

A spatial position of each point in an image is closely related to a color displayed at each point on the page. The relationship between the spatial position and the color is often described by using a continuous function or a piecewise continuous function. The color presented at the position of each point on the primitive is changed gradually, which is known as gradient.

Several types of gradients are defined in the PDF/PostScript standard, including a function gradient, a linear gradient, a circular gradient, a free structure gradient, a staggered structure gradient, Koons gradient, and a tensor gradient. A typical circular gradient is shown in FIG. 1.

As mentioned above, depending on the gradient, the color displayed at each point on a primitive is calculated through a corresponding function, wherein the spatial position of the point will be taken as an independent variable. For example, the following variables are first defined in the circular gradient:
  (a) spatial positions of two circles C0:(x0,y0,r0), C1:(x1,y1,r1);
  (b) initial parameters of the two circles $t_0, t_1$;
  (c) color at the two periphery for the two circles S0,S1;
  (d) a spatial color converting function $f(t)$; and
  (e) all the other points of the spatial space are located at circles Cs: $(x_c(s), y_c(s), r(s))$, each of which corresponds to a value of t where $t_0 \le t \le t_1$.

Next, the color displayed at each point between the circles C0 and C1 are calculated by the following functions:

$$\begin{cases} x_c(s) = x_0 + s \times (x_1 - x_0) \\ y_c(s) = y_0 + s \times (y_1 - y_0) \\ r(s) = r_0 + s \times (r_1 - r_0) \\ s = (t - t_0)/(t_1 - t_0) \end{cases} \quad (1.1)$$

The circle $(x_c(s), y_c(s), r(s))$ in each space corresponds to a specific t, and thus the color value of each point at the periphery may be calculated by plugging t into the function $f(t)$. When the primitive is rasterized, space coordinates may be calculated for each point in the gradient space based on space coordinates of the point in the current device page; t is calculated for the point according to the calculated space coordinates and equations set (1.1); and then the final color displayed at the point is calculated.

According to other types of gradients, the primitive may be described and rasterized in a similar way, that is, the initial parameters $t_0, t_1$ the initial colors S0, S1, the spatial color function $f(t)$ may also be similarly determined, wherein $t_0 \le t \le t_1$.

It can be seen from the above that each device point covered by the primitive needs to be calculated when the primitive is rasterized. Therefore, the rasterization efficiency is relatively low when the resolution of the device is high. In this regard, when the resolution of the device is high, it needs to reduce the resolution first and then to calculate. After that, the reduced resolution needs to be increased up to the original resolution when the final page is finished. Normally, the ratio of the final resolution to the reduced resolution is called resolution reduction coefficient.

Common methods for reducing the resolution are often not flexible. For example, according to some methods, the ratio of the resolution to mesh count of a screening may be determined as the resolution reduction coefficient. According to another method, the ratio of a length of the primitive in the page to the color difference between both ends of the primitive may be determined as the resolution reduction coefficient. The inventors have found that the characteristics of the gradient primitive are not fully considered when reducing the resolution in these methods. As a result, for a relatively gentle color gradient, the current methods may not achieve better rasterization efficiency; on the other hand, for a steep color gradient, they often lose the original characteristics of the primitives. For example, one type of distortions may be that a sawtooth appears at a position of dramatic color transition. An exemplary sawtooth phenomenon is shown in FIG. 2.

SUMMARY OF INVENTION

The present application provides a method and an apparatus for rasterizing a primitive of a graphic image to reduce distortion and/or to increase efficiency.

According to one embodiment of the present application, a method for rasterizing a primitive of the graphic image is provided. According to the method, a primitive may be divided, at a position where a color abruptly changes in the primitive, into a plurality of sub-primitives with continuously and gradually changing colors. Each of the sub-primitives is then rasterized.

According to another embodiment of the present application, an apparatus is provided for rasterizing an image. The apparatus may include a dividing module configured to divide a primitive at a position where a color abruptly changes into a plurality of sub-primitives with continuously and gradually changing colors. Furthermore, the apparatus comprises a rasterizing module configure to rasterize each of the sub-primitives.

The method and the apparatus may rasterize the primitive by region so as to avoid the distortion or lower rasterization efficiency due to the fixed resolution reduction coefficient. Thus, the speed of the rasterization and the quality of the image can be improved.

BRIEF DESCRIPTION OF THE DRAWING

The drawings described herein are used to provide a further understanding to the present application and constitute a part of this specification. Exemplary embodiments of the present application and their descriptions serve to explain the present application and do not constitute improper limitation on the present application. In the drawings.

DETAILED DESCRIPTION

Hereinafter, the present application will be explained in detail with reference to the accompanying drawings in connection with the embodiments. It should be noted that the present application refers to the graphic image processing field, and thus it inevitably needs to use colorful images to illustrate the processing of colors. However, the original color images were rendered as black and white pictures due to publishing and printing. This disclosure will try to use the text to illustrate the colors present in the original drawings.

Figure 1:
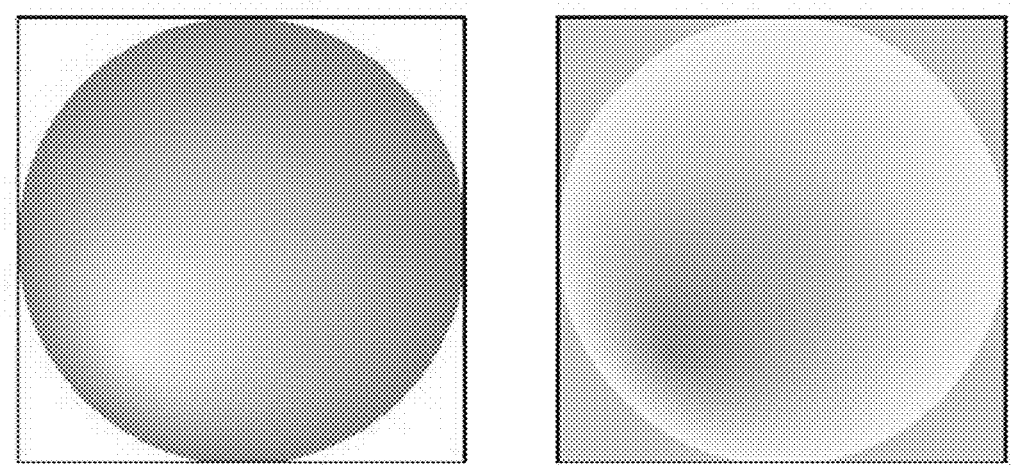
FIG. 1 is a schematic diagram of a circular gradient.
Figure 2:
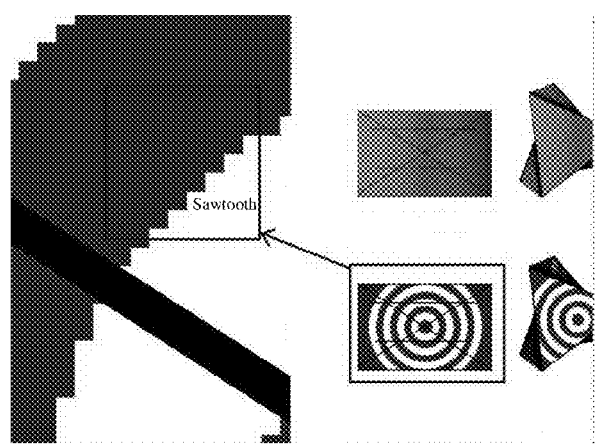
FIG. 2 is a schematic diagram illustrating a sawtooth pattern when the quality of the rasterization is low.
Figure 3:
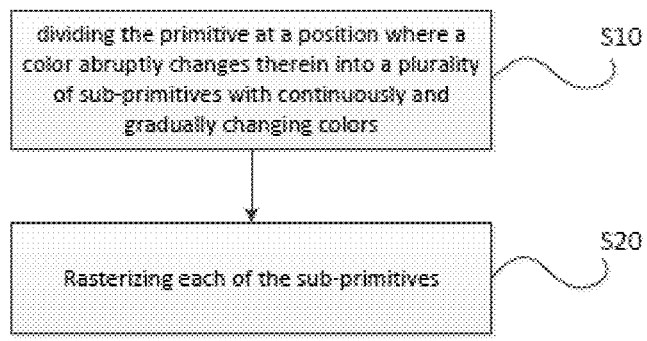
FIG. 3 is a flowchart illustrating a method for rasterization according to an embodiment of the present application.

FIG. 3 is a flowchart illustrating a method for rasterization according to an embodiment of the present application. The method comprises the following two steps.

Step S10: a primitive at a position where a color abruptly changes therein may be divided into a plurality of sub-primitives with continuously and gradually changing colors.

Step S20: each of the sub-primitives may be rasterized.

In prior art references, a resolution reduction coefficient is often fixedly for a primitive, that is, the primitive as a whole is reduced to a fixed resolution. However, there may be a plurality of regions in the primitive, which are very different in color gradients. For a region with a gentle color gradient, a fixed resolution reduction coefficient may be too high such that an image distortion may incur. But for other regions with dramatic color gradients, a fixed resolution reduction coefficient may be too low resulting in lower rasterization efficiencies.

The method for rasterization in this embodiment comprehensively considers the characteristics of the primitive itself and divides the primitive into a plurality of regions based on the gradient. Therefore, the gradient may be rasterized regionally so as to avoid the image distortion or the lower rasterization efficiency due to the fixed resolution reduction coefficient of the primitive. Thus, the speed of the rasterization and the quality of the image can be improved.

In step S10, a shape and structure description of the primitive may be scanned and a spatial position of the primitive in a direction of the gradient may be taken as an independent variable. The corresponding parameters for each point with the independent variable may then be calculated. And then it may be determined whether there are discontinuous parameters in the corresponding parameters, if so, the primitive at a position where the parameter abruptly changes would be divided.

In some embodiments, step S10 may comprise a step of scanning a spatial color function of the primitive to determine if the spatial color function is a piecewise continuous function. If so, the primitive at a position between two adjacent pieces of the piecewise continuous function would be divided.

Generally, the shape and structure description of the primitive may be scanned first, and then the spatial color function may be scanned. In the above embodiment, the position where the color abruptly changes in the primitive can be easily identified.

Figure 4:
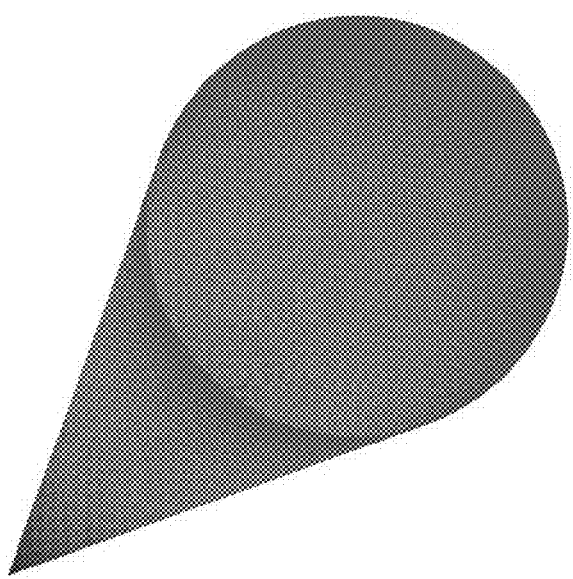
FIG. 4 is a schematic diagram of the circular gradient according to an embodiment of the present application.

FIG. 4 is a schematic diagram of the circular gradient according to one exemplary embodiment of the present application. A primitive with 72 dpi is described as below:

$t_0=0.0$ $t_1=1.0$

Circle 1

The center coordinates: 100.0 100.0

Radius 0

Color C=0.0 M=1.0 Y=0.0 K=0.0

Circle 2

The center coordinates: 300.0 300.0

Radius 120

Color C=1.0 M=0.0 Y=1.0 K=0.0

The spatial color function: $C_i(t)=A_i0+(A_i1-A_i0)*t$

A0=[0.0, 1.0, 0.0, 0.0] A1=[1.0, 0.0, 1.0, 0.0]

that is, $A_10=0.0$, $A_20=1.0$, $A_30=0.0$, $A_40=0.0$; $A_11=1.0$, $A_21=0.0$, $A_31=1.0$, $A_41=0.0$.

Figure 5:
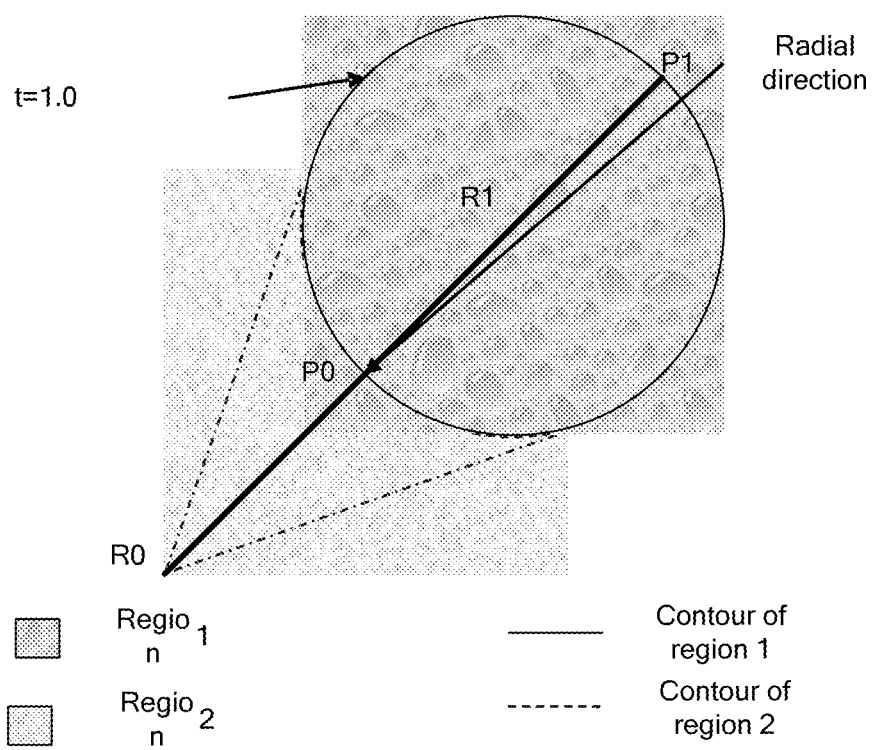
FIG. 5 is a schematic diagram illustrating the gradient primitive of FIG. 4 being divided into different regions.

FIG. 5 is a schematic diagram illustrating the gradient primitive of FIG. 4 being divided into different regions. As shown in FIG. 5, the abruptly changes occur at the periphery t=1.0 in the radial direction in which the two centers of the circles are connected to each other, and thus the primitive may be divided into two parts. One part may be located within the circle of t=1.0, the other part may be located in the other region.

In step S20, the respective resolution reduction coefficient for each sub-primitive may be set based on the ratio of the color change to the spatial size of each sub-primitive, and then the resolution of each sub-primitive may be reduced in accordance with the respective resolution reduction coefficient. In addition, each sub-primitive with the reduced resolution may be rasterized, and the resolution of the rasterized sub-primitive is increased back to the original resolution.

In one embodiment, when the primitive is rasterized, the resolution reduction coefficients are dynamically determined so as to ensure optimal output quality and efficiency.

In the step of setting respective resolution reduction coefficient for each sub-primitive, for the spatial color function of the sub-primitive in each color field, it takes a derivative $d(s_i)/d(l)$ with respect to a spatial length, where $s_i$ is a spatial color function in the $i^{th}$ color field and l is a spatial length. The maximum value max $(d(s_i)/d(l))$ is taken as a quantized value for the color change. And then the resolution reduction coefficient of the sub-primitive nBlockSize may be set based on the quantized value max $(d(s_i)/d(l))$ by rule of:

$n\text{BlockSize}=L_d/(S_{max}/\max(d(s_i)/d(l)))$, wherein $L_d$ is a spatial length in the radial direction of the sub-primitive, and $S_{max}$ is the maximum color difference in the range of the sub-primitive.

The method as described above can be easily implemented to set a resolution reduction coefficient with less calculation. Obviously, the present application is not limited thereto. For example, an average value of $d(s_i)/d(l)$ can be taken as the quantized value for the color change.

In one embodiment consistent with FIG. 4, it may be assumed that the resolution is 600 dpi and the color resolution is 256. The quantized value for the intensity of the color change in two regions and the respective resolution reduction coefficients are calculated, respectively. Since region 1 and region 2 actually are associated with the same spatial color function, the ways for solving the quantized values for the intensity of the color change in two regions are similar.

The following equations can be obtained according to equations (1.1):

$$[(x1-x0)^2+(y1-y0)^2-(r1-r0)^2]*s-2*s*[(x-x0)*(x1-x0)+(y-y0)*(y1-y0)+r0*(r1-r0)]+[(x-x0)^2+(y-y0)^2-r0^2]=0$$

From the above, it can be seen that $0.0 \leq s \leq 1.0$, after the high index items are cancelled out, x and y can be regarded as having a linear change similar to that of s. In addition, the color can be regarded as having a linear change similar to that of s according to the spatial color function. Therefore, the color and the spatial position are both linear changed. As a result, for region 1, it may require a total of 180 steps in the radial direction P0→P1 to linearly change from t=0.3 to t=0.1 based on the color resolution of 256 (that is, on the apparatus, it requires a total of 256 steps from 0.0 to 1.0 if the value of the color steps up 1 each time). Further, the number of pixels in the direction P0→P1 is 600*600/72=5000, so the maximum resolution reduction coefficient is 5000/180=27.

Similarly, the reduction coefficient of region 2 can be solved. The maximum resolution reduction coefficient of region 2 would be 4.

Figure 6:
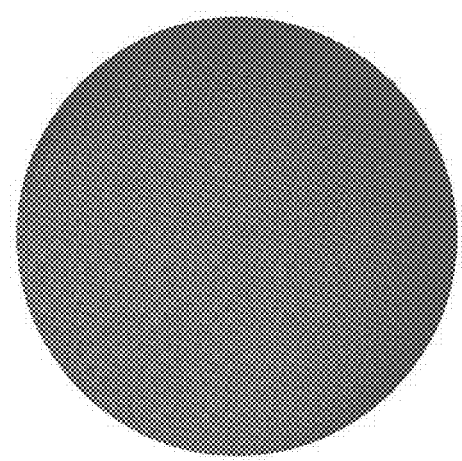
FIG. 6 is a final dot matrix of region 1 shown in FIG. 5.
Figure 7:
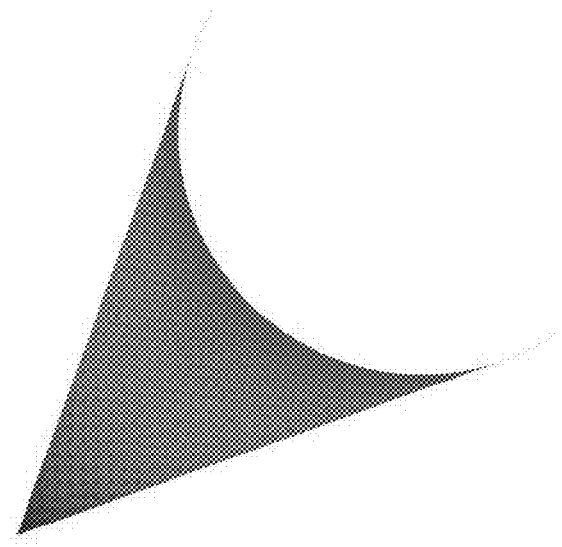
FIG. 7 is a final dot matrix of region 2 shown in FIG. 5.

As shown in FIGS. 6 and 7, dot matrixes of the respective region may be generated based on the actual resolutions.

The method for rasterization further comprises a step of generating a clip path for each sub-primitive when obtaining the plurality of sub-primitives with continuously and gradually changing colors, defining a range of each sub-primitive with the respective clip path when the resolution of the rasterized sub-primitives is increased to the original resolution. The collective set of all the clip paths may form the outline path of the original primitive. As shown in FIG. 5, after the primitive is divided into two regions, the boundary contours of the two regions may be taken as the clip paths to define the two regions. In one embodiment, an overflow may be avoided when the resolution of sub-primitives are increased back to the original value.

Figure 8:
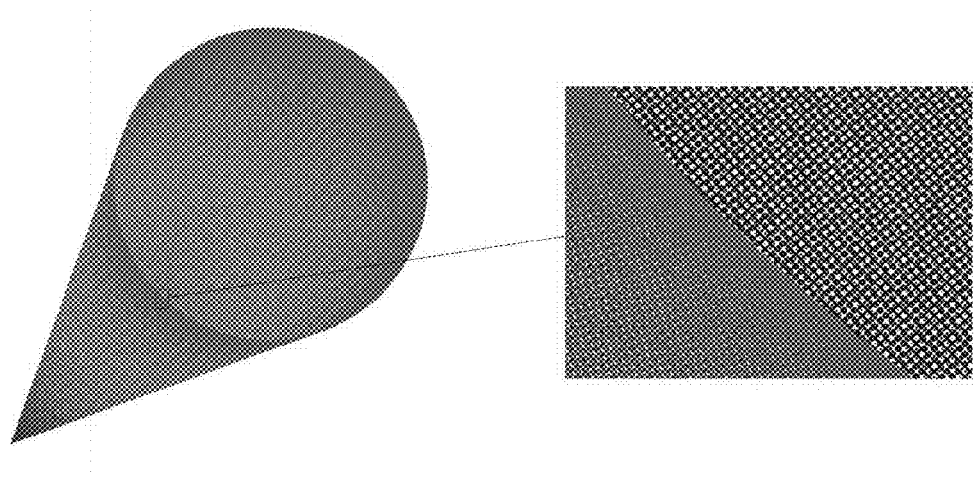
FIG. 8 is a final dot matrix of the gradient primitive shown in FIG. 5.

As shown in FIG. 8, when the two regions are output onto pages, the final output result of the gradient primitive can be achieved. In addition, in this embodiment, no sawtooth appears at a position of color transition of the primitive.

Figure 9:
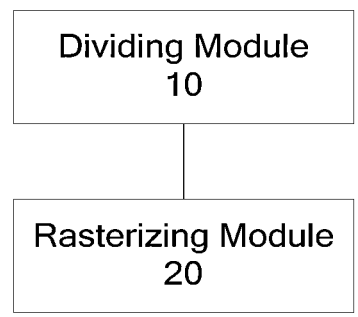
FIG. 9 is a schematic diagram illustrating an apparatus for rasterization according to an embodiment of the present application.

FIG. 9 is a schematic diagram illustrating an apparatus for rasterization according to an embodiment of the present application. The apparatus may comprise a dividing module 10 configured to divide a primitive at a position where a color abruptly changes therein into a plurality of sub-primitives with continuously and gradually changing colors. Furthermore, the apparatus may comprise a rasterizing module 20 configure to rasterize each of the sub-primitives.

The apparatus according to the embodiment may comprehensively consider the characteristics of the primitive itself and divide the primitive into a plurality of regions based on the gradient. Therefore, the apparatus may rasterize the gradient regionally so as to avoid image distortion or lower rasterized efficiency due to the fixed resolution reduction coefficient of the primitive. Thus, the speed of the rasterization and the quality of the image can be improved.

In some embodiments, the dividing module 10 may comprise a first scanning module configured to scan a shape and structure description of the primitive. The dividing module 10 may further comprise a first dividing module configured to take a spatial position in a direction of the gradient as an independent variable and calculate corresponding parameters for each point with the independent variable. In addition, the first dividing module may be configured to determine whether there are discontinuous parameters in the corresponding parameters. If so, the first dividing module may operate to divide the primitive at a position where the parameter abruptly changes. Additionally, the dividing module 10 may further comprise a second scanning module configured to scan a spatial color function of the primitive and a second dividing module configured to divide the primitive at a position between each adjacent two pieces of the piecewise continuous function if the spatial color function is a piecewise continuous function. In the above embodiment, the position where the color abruptly changes in the primitive can be easily identified.

In some embodiments, the rasterizing module 20 may comprise a coefficient setting module configured to set respective resolution reduction coefficient for each sub-primitive based on the ratio of the color change to the spatial size of each sub-primitive. Furthermore, the rasterizing module 20 may comprise a reducing resolution module configured to reduce the resolution of each sub-primitive based on the respective resolution reduction coefficient. In addition, the rasterizing module 20 may further comprise a performing module configured to rasterize each of the sub-primitives, which has a reduced resolution. Furthermore, the rasterizing module 20 may comprise a recovering module configured to increase the resolution of the rasterized sub-primitive back to the original resolution. In some embodiments, when the primitive is rasterized, the resolution reduction coefficients are dynamically determined to ensure optimal output quality and efficiency In some embodiments, the coefficient setting module may further comprise a derivation module configured to take a derivative $d(s_i)/d(l)$ with respect to a spatial length for the spatial color function of the sub-primitive in each color field, where $s_i$ is a spatial color function in the $i^{th}$ color field and l is a spatial length. Furthermore, the coefficient setting module may comprise a quantizing module configured to take the maximum value max $(d(s_i)/d(l))$ therein as a quantized value for the color change. In addition, the coefficient setting module may comprise a calculating module configured to set the resolution reduction coefficient of the sub-primitive nBlockSize as nBlockSize=$L_d/(S_{max}/\max(d(s_i)/d(l)))$, where $L_d$ is a spatial length in the radial direction of the sub-primitive, and $S_{max}$ is the maximum color difference in the range of the sub-primitive.

The apparatus as described can be easily implemented to set the resolution reduction coefficient with less calculation.

In view of the above, the method and the apparatus according to the embodiments of the present application may achieve an efficient rasterization of the gradient primitive with a high quality. With the method and the apparatus according to the embodiments of the present application, the efficiency of the rasterization can be improved while the quality of the rasterization of the primitive is maintained.

It will be readily apparent to those skilled in the art that the modules or steps of the present application may be implemented with a common computing device. In addition, the modules or steps of the present application can be concentrated or run in a single computing device or distributed in a network composed of multiple computing devices. Optionally, the modules or steps may be achieved by using codes of executable programs, so that they can be stored in the computer storage medium, or the plurality of the modules or steps can be fabricated into an individual integrated circuit module. Therefore, the present application is not limited to any particular hardware, software or combination thereof.

The foregoing describe only exemplary embodiments of the present application, and it is not intended to limit the present application. Moreover, it will be apparent to those skilled in the art that various modifications and variations can be made to the present application, such as a rasterization of a function gradient, a linear gradient, a circular gradient, a free structure gradient, a staggered structure gradient, Koons gradient and a tensor gradient. Thus, any modifications, equivalent substitutions, improvements etc. within the spirit and principle of the present application should be included within the scope of protection of the application.

What is claimed is:

1. A method for rasterizing a primitive of an image, comprising:
dividing the primitive at a position where a color discontinuously changes into a plurality of sub-primitives with continuously changing colors; and
rasterizing each of the sub-primitives,
wherein the step of rasterizing further comprises:
setting respective resolution reduction coefficient nBlockSize for each sub-primitive in accordance with a ratio of the color change to the spatial size of each sub-primitive;
reducing the resolution of each sub-primitive based on the respective resolution reduction coefficient;
rasterizing each sub-primitive with the reduced resolution; and
increasing the resolution of the rasterized sub-primitive to the original resolution, and
wherein the step of setting respective resolution reduction coefficient further comprises:
taking the maximum value max $(d(s_i)/d(l))$ as a quantized value for the color change, wherein $(d(s_i)/d(l))$ is a derivative with resect to a spatial length l for the spatial color function of the sub-primitive in each color field, where $s_i$ is a spatial color function in $i^{th}$ color field; and
setting the resolution reduction coefficient of the sub-primitive nBlockSize based on the quantized value max $(d(s_i)/d(l))$ as follows:

$n\text{BlockSize}=L_d/(S_{max}/\max(d(s_i)/d(l)))$, where $L_d$ is a spatial length in the radial direction of the sub-primitive, and $S_{max}$ is the maximum color difference in the range of the sub-primitive.

2. The method according to claim 1, wherein the step of dividing further comprises:
scanning a shape and structure description of the primitive to obtain a plurality of spatial positions (C);
determining a plurality of position parameters (t) for the scanned spatial positions;
dividing the primitive at a position corresponding to discontinuous position parameters of the determined position parameters.

3. The method according to claim 1, wherein the step of dividing further comprises:
scanning a spatial color function of the primitive to determine whether it is a piecewise continuous function, and
dividing the primitive at a position between each adjacent two pieces of the piecewise continuous function.

4. The method according to claim 1, further comprising:
generating a clip path for each sub-primitive with continuously changing colors; and
defining a range of each sub-primitive in accordance with the respective clip path such that the resolution of the rasterized sub-primitives is increased within the defined range.

5. An apparatus for rasterizing a primitive of an image, comprising:
a dividing module configured to divide the primitive at a position where a color discontinuously changes into a plurality of sub-primitives with continuously changing colors; and
a rasterizing module configured to rasterize each of the sub-primitives,
wherein the rasterizing module comprises:
a coefficient setting module configured to set respective resolution reduction coefficient nBlockSize for each sub-primitive based on the ratio of the color change to a spatial size of each sub-primitive; and
a reducing resolution module configured to reduce the resolution of each sub-primitive based on the respective resolution reduction coefficient;
a performing module configured to rasterize the sub-primitive with the reduced resolution; and
a recovering module configured to increase the resolution of the rasterized sub-primitive to the original resolution, and
wherein the coefficient setting module comprises:
a derivation module configured to take a derivative $(d(s_i)/d(l))$ with resect to a spatial length for the spatial color function of the sub-primitive in each color field, where $s_i$ is a spatial color function in $i^{th}$ color field and l is a spatial length;
a quantizing module configured to take the maximum value max $(d(s_i)/d(l))$ as a quantized value for the color change; and
a calculating module configured to set the resolution reduction coefficient of the sub-primitive nBlockSize based on the quantized value max $(d(s_i)/d(l))$ as follows:

$n\text{BlockSize}=L_d/(S_{max}/\max(d(s_i)/d(l)))$, where $L_d$ is a spatial length in the radial direction of the sub-primitive, and
$S_{max}$ is the maximum color difference in the range of the sub-primitive.

6. The apparatus according to claim 5, wherein the dividing module further comprises:
a first scanning module configured to scan a shape and structure description of the primitive to obtain a plurality of spatial positions (C);
a first dividing module configured to determine a plurality of position parameters (t) for the scanned spatial positions, and divide the primitive at a position corresponding to discontinuous position parameters of the determined position parameters.

7. The apparatus according to claim 6, wherein the dividing module further comprises:
a second scanning module configured to scan a spatial color function of the primitive to determine if it is a piecewise continuous function; and
a second dividing module configured to divide the primitive at a position between each adjacent two pieces of the piecewise continuous function.

* * * * *